Feb. 19, 1924.

J. B. DAVIES

CORE

Filed April 21, 1922

1,484,299

Inventor
John B. Davies
By A. L. Ely
Attorney

Patented Feb. 19, 1924.

1,484,299

UNITED STATES PATENT OFFICE.

JOHN B. DAVIES, OF AKRON, OHIO, ASSIGNOR TO THE FIRESTONE TIRE AND RUBBER COMPANY, OF AKRON, OHIO, A CORPORATION OF OHIO.

CORE.

Application filed April 21, 1922. Serial No. 555,839.

*To all whom it may concern:*

Be it known that I, JOHN B. DAVIES, a citizen of the United States, residing at Akron, in the county of Summit, State of Ohio, have invented certain new and useful Improvements in Cores, of which the following is a specification.

My invention relates, broadly, to improvements in cores for use in the tire manufacturing or analogous arts.

Specifically it has to do with the type of core that is used in repairing tire casings through the process of vulcanization, although, in actual practice, it is not confined to this precise relation, as will hereinafter appear.

Such repair cores are commonly constructed in segmental form and are adapted to be used singly within the tire casing, and in conjunction with a segmental mold, or a wrapping, that is disposed exteriorily of the casing, all of which will be understood in the art without further explanation. It is desirable with cores of this character, that the exterior contour of the core, particularly its cross-sectional contour, exactly conforms to the curvature of the interior surface of the casing. Otherwise the repaired portion of the casing would present a distorted appearance, the fabric or cords would be subjected to injurious crimping, and strain at the distorted areas, and the bead portions of the casing throughout the repaired section would be thrown out of alignment with the remaining portion of the casings. Therefore, it necessarily follows that repair cores, as commonly constructed, can only be utilized in repairing one style or type of casing, and inasmuch as the inner contour of the bead portions, of various makes and types of tires varies, to a considerable degree, cores corresponding in contour to each make and type are required in repair work, where one type of core might suffice if such variations in the contours of the bead portions of casings did not exist.

The present invention is directed toward providing a practical form of core whereby the above mentioned difficulties may be obviated and which may be utilized in repairing various types of casings in which the cross-sectional contour of the inner surface of each type is different as regards the bead portions thereof.

Ancilliary objects, and advantages, such as simplicity of construction, and relatively low cost of manufacture, will appear when the following description is read in conjunction with the drawings accompanying and forming a part of this specification.

Figure 1:
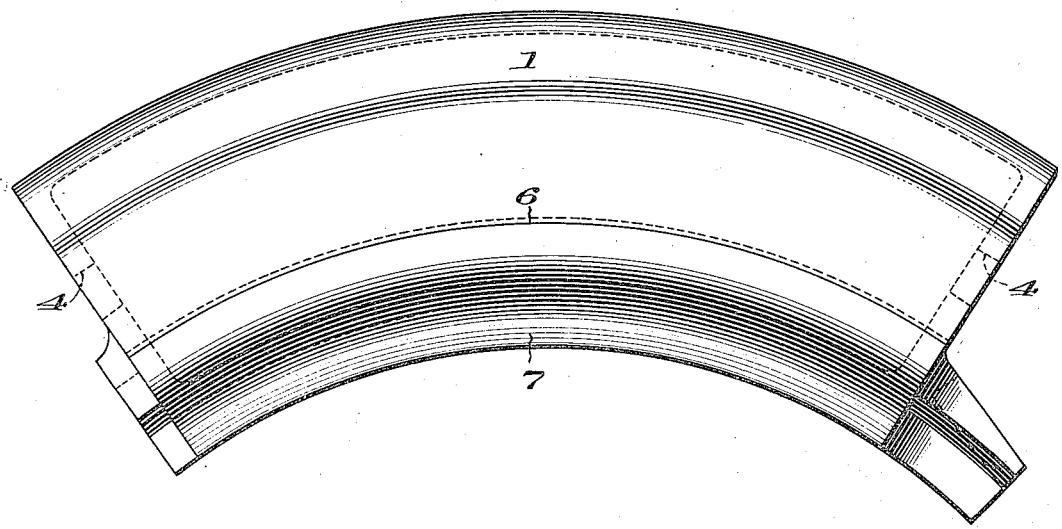
Figure 1 is a side elevational view of a core embodying my invention.
Figure 2:
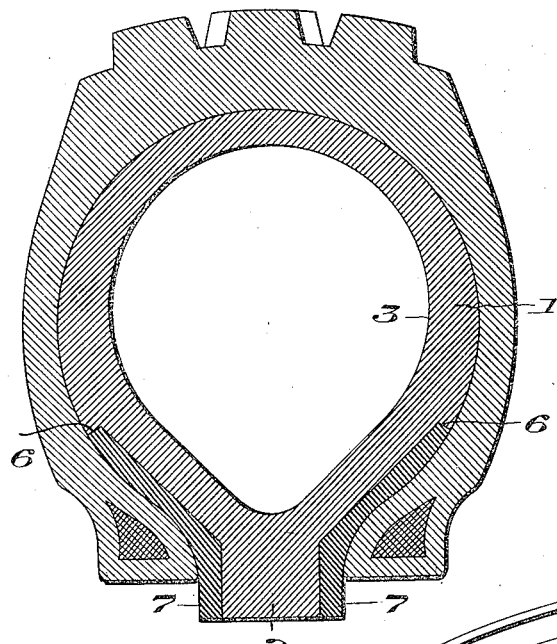
Figure 2 is a transverse sectional view on an enlarged scale.

In the preferred practice of my invention the core comprises the usual arcuate section 1, that embodies a radial flange 2, and is provided with a chamber 3 for receiving a heating medium such as steam. The heating medium may be introduced into and exhausted from the chamber 3 in any suitable manner and by any suitable means. In the present instance openings 4 are shown in the end walls of the section to receive the usual connections which, inasmuch as they form, per se, no part of the present invention, have not been illustrated in the drawings. The side surfaces of a core of this character, immediately adjacent the flange 2 and including a portion of the surface of the flange are usually formed, in transverse section, with a compound curvature, to cooperate with the inner surfaces of the bead portions of the tire. It is with this feature of the core that my invention is particularly concerned. As previously stated, the inner surface of the bead portions of different types and makes of tires vary in cross-section, with each type, and it is imperative that the contour of the core throughout, what may be termed the bead engaging surfaces thereof, should exactly conform to such curvatures. I propose to provide a core comprising removable and replaceable elements whereby a single core may be adapted for use with various types of tires.

Figure 3:
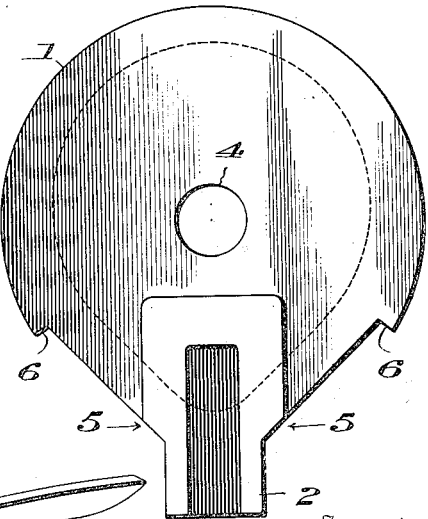
Figure 3 is an elevational view, on an enlarged scale of the one end of a portion of the core.
Figure 4:
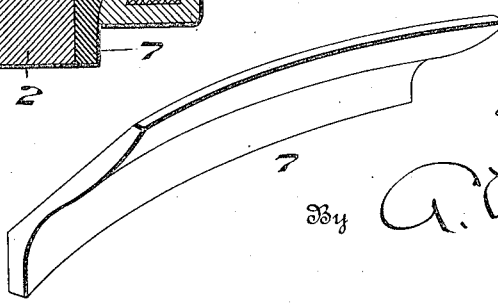
Figure 4 is a detail perspective view of a detail of the invention.

To this end, I provide upon each side of the core 1 a recessed seat 5 that is coextensive with the length of the core. As best shown in Figure 3 each seat 5, in transverse section, extends from the edge of the radial flange 2 to a point on the side of the core beyond where the inner surface of the bead of a casing will terminate when the core is in use. At this point the seat, as shown in Figure 1, terminates in a substantially right angled shoulder 6 that, lengthwise of the core, is curved in the same radius as the circumferences of said core. The seats 5 are each designed to receive a plate 7 one of which is shown in Figure 4. Any suitable expedient may be utilized for retaining the plates 7 upon the core if desired, but in actual practice it will be found that the beads of the tire will suffice in this respect until the mold or wrapping has been positioned relative to the core when the plates will be securely clamped in place. The plates 7 are each curved in a lengthwise direction and have their rear faces constructed, in cross-section, to also form an obtuse angle whereby they snugly engage the seats 5, with their longer edge abutting respectively the shoulders 6 of the seats. The outer face of each plate 7 is curved transversely in conformity with the curvature of the inner bead surface of a particular type of casing. In practicing the invention I may provide any number of these plates for use in conjunction with a single core each plate being formed in the precise cross-sectional curvature of the inner bead surface of different form or type of tire.

Obviously a different plate may be readily substituted for a prior one when desired, and the same core thus equipped for use with any number of tires each of which embodies characteristic bead contours.

Although I have described my invention in detail, it is to be understood that the present disclosure is merely illustrative and is not designed to limit the scope or spirit of the invention unless such limitations are particularly emphasized in the claims appended hereto.

What I claim is:

1. A core adapted for molding the inner surface of a tire casing comprising, an arcuate body portion, and a removable plate countersunk in one side face thereof.

2. A core adapted for molding the inner surface of a tire casing comprising, an arcuate body portion, and a removable plate countersunk in one side face thereof said plate being substantially coextensive with the length of the body portion.

3. A core adapted for molding the inner surface of a tire casing comprising, an arcuate body portion, and a removable plate countersunk on one side face thereof in a position to span the inner surface of the bead portion of the casing.

4. A core comprising, a tubular body portion having a radial flange coextensive with the length thereof, and a removable plate countersunk in one side face of the body portion arranged to cover the flange and the portion of the side face adjacent the flange.

5. A core comprising, a tubular body portion having a radial flange coextensive with the length thereof, and a removable plate countersunk in one side face of the body portion in position to cover the flange said plate being provided with a transverse face of a compound curvature.

6. A core adapted for molding the inner surface of a tire casing comprising, an arcuate body portion having a radial flange extending throughout the length thereof, and a removable curvilinear plate countersunk in one side face thereof said plate being coextensive with the length of said body portion.

7. A core adapted for molding the inner surface of a tire casing comprising, an arcuate body portion having a radial flange extending throughout the length thereof one side face of the flange and its adjacent side face of the body portion being constructed to form in transverse section a V-shaped seat countersunk, and a curvilinear removable plate adapted to be received in said seat one side face of the plate being formed in transverse section with a compound curvature.

8. A core adapted for molding the inner surface of a tire casing comprising, an arcuate body portion having a radial flange extending throughout the length thereof one side face of the flange and its adjacent side face of the body portion being constructed to form in transverse section a V-shaped countersunk seat terminating in a curvilinear shoulder, and a curvilinear removable plate adapted to fit in said seat and against said shoulder the outer side face of the plate being formed in transverse section with a compound curvature.

JOHN B. DAVIES.